(12) United States Patent
Han et al.

(10) Patent No.: US 11,023,742 B2
(45) Date of Patent: Jun. 1, 2021

(54) REAR-FACING PERCEPTION SYSTEM FOR VEHICLES

(71) Applicant: TuSimple, Inc., San Diego, CA (US)

(72) Inventors: Xiaoling Han, San Diego, CA (US); Xue Mei, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 0 days.

(21) Appl. No.: 16/125,531

(22) Filed: Sep. 7, 2018

(65) Prior Publication Data

US 2020/0082175 A1    Mar. 12, 2020

(51) Int. Cl.
*G06K 9/00* (2006.01)
*H04N 5/232* (2006.01)
(Continued)

(52) U.S. Cl.
CPC ....... *G06K 9/00791* (2013.01); *H04B 7/2621* (2013.01); *H04N 5/23299* (2018.08); (Continued)

(58) Field of Classification Search
CPC .......... G06K 9/00791; H04N 5/23299; H04N 5/232411; H04N 7/181; H04B 7/2621; G05D 1/0231; G05D 1/0257
See application file for complete search history.

(56) References Cited

U.S. PATENT DOCUMENTS

| 5,680,123 A * | 10/1997 | Lee ......................... | B60Q 1/52 340/937 |
| 5,978,017 A * | 11/1999 | Tino ....................... | B60Q 1/52 348/148 |

(Continued)

FOREIGN PATENT DOCUMENTS

KR        101736411 B1    5/2017

OTHER PUBLICATIONS

Brahma et al.; Design of PC Based Wireless Video Camera Positioning System for Wide Area Monitoring; Jun. 2013; IJERT, ISSN: 2278-0181; pp. 1-4.*

(Continued)

*Primary Examiner* — Peter D Le
(74) *Attorney, Agent, or Firm* — Paul Liu; Perkins Coie, LLP

(57) ABSTRACT

Devices, systems and methods for operating a rear-facing perception system for vehicles are described. An exemplary rear-facing perception system contains two corner units and a center unit, with each of the two corner units and the center unit including a camera module and a dual-band transceiver. A method for operating the rear-facing perception system includes pairing with a control unit by communicating, using the dual-band transceiver, over at least a first frequency band, transmitting a first trigger signal to the two corner units over a second frequency band non-overlapping with the first frequency band, and switching to an active mode. In an example, the first trigger signal causes the two corner units to switch to the active mode, which includes orienting the camera modules on the center unit and the two corner units to provide an unobstructed view of an area around a rear of the vehicle.

16 Claims, 11 Drawing Sheets

(51) Int. Cl.
    *H04B 7/26*    (2006.01)
    *H04N 7/18*    (2006.01)
    *G05D 1/02*    (2020.01)

(52) U.S. Cl.
    CPC ....... *H04N 5/232411* (2018.08); *H04N 7/181* (2013.01); *G05D 1/0231* (2013.01); *G05D 1/0257* (2013.01)

(56) References Cited

U.S. PATENT DOCUMENTS

| | | | |
|---|---|---|---|
| 6,317,035 B1* | 11/2001 | Berberich | B60R 25/24 340/10.2 |
| 6,542,182 B1* | 4/2003 | Chutorash | B60R 1/00 348/148 |
| 6,741,165 B1* | 5/2004 | Langfahl | B60R 25/1004 307/10.2 |
| 6,975,923 B2 | 12/2005 | Spriggs | |
| 7,742,841 B2 | 6/2010 | Sakai et al. | |
| 8,346,480 B2 | 1/2013 | Trepagnier et al. | |
| 8,706,394 B2 | 4/2014 | Trepagnier et al. | |
| 8,718,861 B1 | 5/2014 | Montemerlo et al. | |
| 8,841,987 B1* | 9/2014 | Stanfield | G07C 9/00857 340/5.61 |
| 8,983,708 B2 | 3/2015 | Choe et al. | |
| 9,088,744 B2 | 7/2015 | Grauer et al. | |
| 9,214,084 B2 | 12/2015 | Grauer et al. | |
| 9,219,873 B2 | 12/2015 | Grauer et al. | |
| 9,282,144 B2 | 3/2016 | Tebay et al. | |
| 9,317,033 B2 | 4/2016 | Ibanez-guzman et al. | |
| 9,327,685 B1* | 5/2016 | Wooten | B60R 25/102 |
| 9,347,779 B1 | 5/2016 | Lynch | |
| 9,418,549 B2 | 8/2016 | Kang et al. | |
| 9,494,935 B2* | 11/2016 | Okumura | B60W 30/00 |
| 9,507,346 B1 | 11/2016 | Levinson et al. | |
| 9,513,634 B2 | 12/2016 | Pack et al. | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,739,609 B1 | 8/2017 | Lewis | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 2001/0019363 A1* | 9/2001 | Katta | H04N 5/232 348/333.01 |
| 2002/0024460 A1* | 2/2002 | Ghosh | B60R 25/24 342/43 |
| 2002/0163419 A1* | 11/2002 | Ott | B60R 25/24 340/5.61 |
| 2003/0098615 A1* | 5/2003 | Fischer | B60R 25/24 307/10.5 |
| 2003/0141972 A1* | 7/2003 | Yang | G08B 13/19669 340/531 |
| 2004/0107031 A1* | 6/2004 | Ichikawa | B60R 25/04 701/36 |
| 2005/0174429 A1* | 8/2005 | Yanai | B60R 1/00 348/148 |
| 2006/0098094 A1* | 5/2006 | Lott | B60R 1/00 348/148 |
| 2006/0103516 A1* | 5/2006 | Zang | B60N 2/002 340/457 |
| 2006/0133476 A1* | 6/2006 | Page | G08B 13/19647 375/240.01 |
| 2006/0176370 A1* | 8/2006 | Chen | B60R 1/00 348/148 |
| 2007/0088488 A1* | 4/2007 | Reeves | G07C 5/085 701/117 |
| 2007/0202839 A1* | 8/2007 | Abraham | H04B 3/548 455/402 |
| 2008/0030588 A1* | 2/2008 | Boss | H04N 5/23203 348/211.2 |
| 2008/0055407 A1* | 3/2008 | Abe | G01C 21/26 348/118 |
| 2009/0058685 A1* | 3/2009 | McCall | G08G 1/005 340/995.24 |
| 2011/0161140 A1* | 6/2011 | Polt | G07B 15/063 705/13 |
| 2012/0265369 A1* | 10/2012 | Knight | H04B 1/034 701/2 |
| 2013/0128047 A1* | 5/2013 | Lee | B60R 1/00 348/148 |
| 2014/0340510 A1* | 11/2014 | Ihlenburg | H04N 7/18 348/118 |
| 2014/0354814 A1* | 12/2014 | Han | B60R 11/04 348/148 |
| 2015/0009010 A1* | 1/2015 | Biemer | G06F 21/32 340/5.83 |
| 2015/0103159 A1* | 4/2015 | Shashua | G06K 9/00798 348/118 |
| 2015/0169968 A1* | 6/2015 | Michmerhuizen | G06K 9/00805 348/148 |
| 2015/0172518 A1 | 6/2015 | Lucas et al. | |
| 2015/0302737 A1* | 10/2015 | Geerlings | G08C 17/02 340/5.25 |
| 2015/0319608 A1* | 11/2015 | Varughese | H04W 48/04 455/456.4 |
| 2015/0336521 A1* | 11/2015 | Tofilescu | B60R 16/023 382/104 |
| 2016/0334230 A1 | 11/2016 | Ross et al. | |
| 2016/0349363 A1* | 12/2016 | Millar | G01S 13/89 |
| 2016/0379350 A1* | 12/2016 | Matsui | B60Q 1/44 348/125 |
| 2017/0057423 A1* | 3/2017 | Wang | B60R 11/04 |
| 2017/0083771 A1* | 3/2017 | Clark | H04N 7/181 |
| 2017/0166163 A1* | 6/2017 | Poma | G07C 9/00174 |
| 2017/0262717 A1 | 9/2017 | Drazan et al. | |
| 2017/0301201 A1 | 10/2017 | Siann et al. | |
| 2017/0346878 A1* | 11/2017 | Baker | H04L 65/605 |
| 2018/0319320 A1* | 11/2018 | Tatara | B60Q 1/24 |
| 2020/0082175 A1 | 3/2020 | Han | |

OTHER PUBLICATIONS

Park, Tae Wook. International Application No. PCT/US2019/050212, International Search Report and Written Opinion, dated Dec. 20, 2019. (pp. 1-13).

* cited by examiner

REAR-FACING PERCEPTION SYSTEM FOR VEHICLES

TECHNICAL FIELD

This document relates to vehicle monitoring and control.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is precise perception of the area around the rear of the vehicle.

SUMMARY

Disclosed are devices, systems and methods for a rear-facing perception system for vehicles. In some embodiments, a self-powered and an automatically synchronizing rear-facing perception system, which includes a center unit and two corner units, is installed at the rear of a vehicle or on a semi-trailer truck (commonly referred to as a tractor-trailer or a "semi") and provides an unobstructed of an area around a rear of the vehicle. The corner and center units wirelessly communicate with a control unit located adjacent to the driver of the vehicle.

In one aspect, the disclosed technology can be used to provide a method for operating a rear-facing perception unit in a vehicle. An exemplary rear-facing perception system contains two corner units and a center unit, with each of the two corner units and the center unit including a camera module and a dual-band transceiver. This method includes pairing with a control unit by communicating, using the dual-band transceiver, over at least a first frequency band, transmitting, upon successfully pairing, a first trigger signal to the two corner units, where the first trigger signal is transmitted over a second frequency band non-overlapping with the first frequency band, and switching, subsequent to transmitting the first trigger signal, to an active mode, where the first trigger signal causes the two corner units to switch to the active mode, where the power module includes a battery, and where the active mode includes orienting the camera modules on the center unit and the two corner units to provide an unobstructed view of an area around a rear of the vehicle.

In another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

Figure 1:
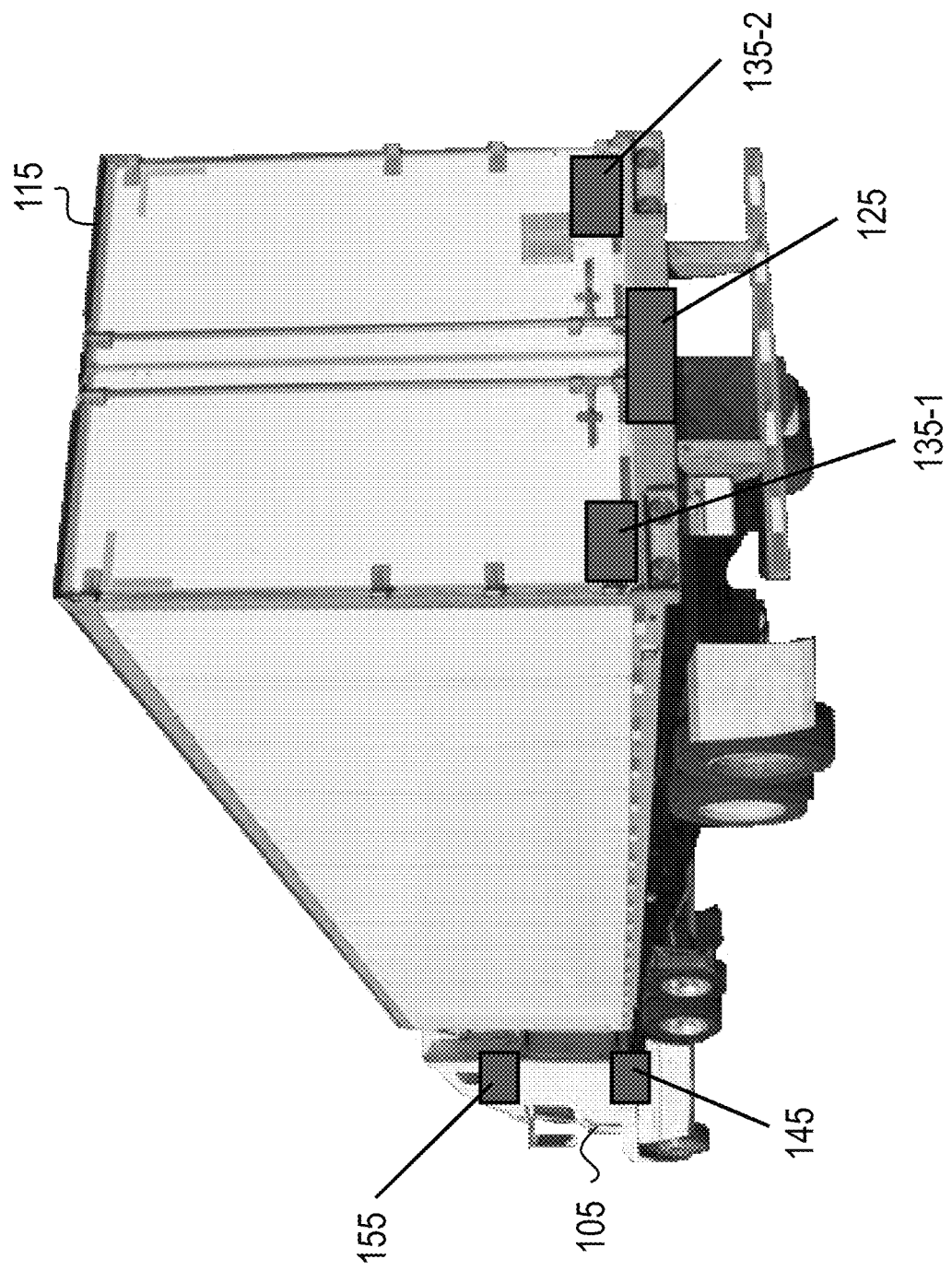
FIG. 1 shows an example of the rear-facing perception system installed on a semi-trailer truck (commonly referred to as a tractor-trailer).

Backover accidents cause thousands of injuries every year because there is a blind spot behind every car and truck. Typically, this blind spot stretches from 15 feet in smaller cars to more than 25 feet in larger pickups and SUVs, and to even longer distances for tractor-trailers. Human drivers often rely on their visual inspection of the rear of their vehicle performed prior to entering the vehicle for driving. However, autonomous vehicles do not have such a mechanism. The increasing use of autonomous vehicles makes it important to use precise perception of objects at and around the rear of a vehicle, especially in the case of tractor-trailers that maneuver around static barriers, loading docks, etc. as a part of their daily operations.

A backup camera (or more generally, a rear-facing perception system) may maintain a driver's control and visibility while operating a vehicle. For example, it can prevent backing up over someone (with toddlers and pets being particularly susceptible) or something, and may assist with parallel parking while avoiding damage to adjacent vehicles. In another example, and if the vehicle were run into by another vehicle, the rear-facing perception system may provide evidence of the incidence for insurance purposes.

A rear-facing perception system can increase the operational safety of autonomous vehicles. Unlike passenger cars, where a rear-facing camera is permanently installed in the vehicle, some applications of autonomous vehicles may use rear perception systems only occasionally. For example, in cargo delivery business, truck cabs (cabins or tractors) are often attached to different cargo holds or trailers. Therefore, it would be useful to include a rear-perception system that requires very little or no installation when a truck cab is attached to another trailer. In particular, it would be beneficial if the truck driver does not have to attach cables from the rear perception system portion on the trailer to a display and other electronics in the cabin. Easy formation and activation of rear perception system in such cases saves the truck driver the additional time and work and eliminates manual errors in connecting and setting up the system. Furthermore, transport service providers often manage a large inventory of trailers and cabins, and truck trailers may often simply sit in a parking lot when not being used. In such a case, it would be desirable if the electronics associated with a rear perception system is put to use by a simple detachment from a trailer not being used and attachment to another trailer that will be paired with a truck cabin and used.

Some desirable features of such a system may include: (i) installation capabilities on trailers of semi-trailer trucks, thereby providing complete rear perception without blind spots, (ii) low-cost and self-powered, (iii) easily installable and detachable, (iv) the ability to wirelessly communicate with the driver, (v) precisely perceive the locations of all objects in the backup route, and (vi) provide automated calibration and synchronization.

The disclosed technology in this document provides solutions that can be used to address the above and other technical issues in the rear-facing monitoring and control of fully- and semi-autonomous vehicles. FIG. 1 shows an example of the rear-facing perception system installed on a semi-trailer truck (commonly referred to as a tractor-trailer). As shown therein, a center integration unit (CIU, 125), a left corner integration unit (LIU, 135-1) and a right corner integration unit (RIU, 135-2) are mounted on the trailer 115, and a vehicle control unit (VCU, 145) and a telematics box 155 are mounted on the tractor 105 of the tractor-trailer.

In some embodiments, a subset of components of the rear-facing perception system (the CIU, LIU and RIU) shown in FIG. 1 may be advantageously installed on the rear and/or sides of the trailer to provide full rear perception coverage, with no blind spots or zones. Other advantageous features of embodiments of the disclosed technology include, but are not limited to, battery or solar panels to enable self-power capabilities (e.g., no reliance on wires or an external power source), easy installation capabilities (e.g., attached to be firmly secured, and then easily detached), wireless communication capabilities that obviate the need for complex electrical and mechanical construction, and which can support over-the-air (OTA) updates, and automated synchronization and calibration capabilities. In addition, the CIU, LIU and RIU may include a variety of different sensors whose information may be fused to enable precise detection of objects and/or people that may be present behind the vehicle.

In some embodiments, the CIU, LIU and RIU include an attachment mechanism that is configured to enable easy attachability and detachability of the integration units to the vehicle or trailer of a tractor-trailer. For example, the attachment mechanism may be a magnetic panel that may be used to easily affix the integration units to the trailer. In another example, a suction panel or a hook-and-fastener system may be used for the attachment mechanism.

Figure 2:
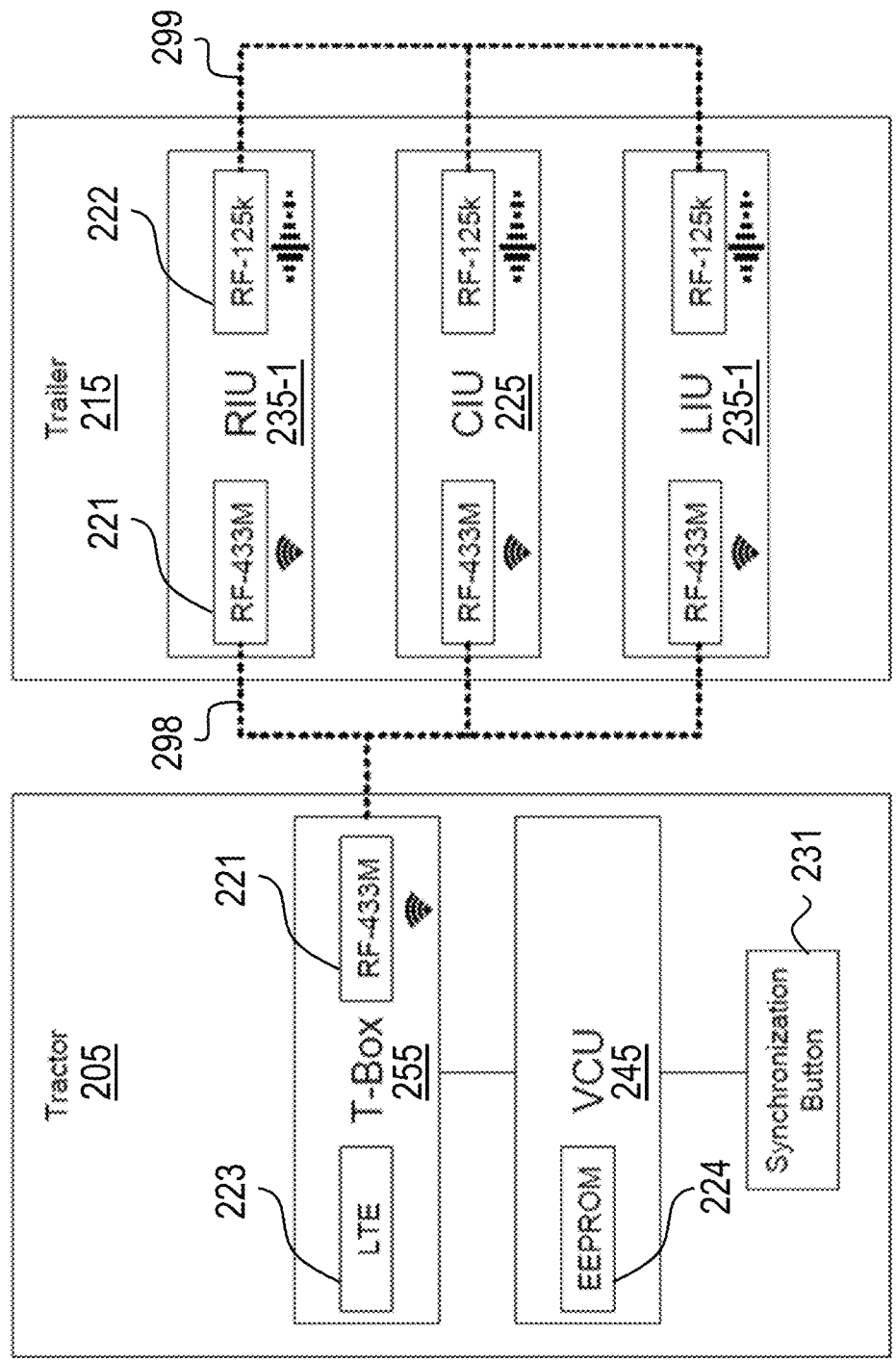
FIG. 2 shows a block diagram of an example rear-facing perception system.

FIG. 2 shows a block diagram of an example rear-facing perception system, and is one example of packing functional (e.g., communication) sub-components into the components described in the context of FIG. 1. As shown in FIG. 2, embodiments of the disclosed technology may support communications in a number of different frequency bands and using multiple standards. This feature advantageously provides the components (or modules) the ability to simultaneously communicate, without interfering with the communication of other components or modules.

In some embodiments, and as shown in FIG. 2, the tractor 205 include the VCU 245, the telematics box 255, and a synchronization button 231 (for manual synchronization, which will be discussed later in this document). For example, the telematics box may include a dual-band transceiver that supports communications using the LTE standard 223 as well as radio frequency (RF) communications in an Ultra High Frequency (UHF) band 221 (e.g., using a low power device 433 MHz (LPD433)). The LTE transceiver 223 may be used by the tractor to provide the driver with updates from traffic and map services, whereas the RF-433M transceiver 221 may be used to communicate with the CIU, LIU and/or RIU that are attached to the trailer 215. In another example, the VCU 245 may include an EEPROM (electrically erasable programmable read-only memory) 224 that may be configured to store the addresses and/or IDs for each of the components of the rear-facing perception system, in order to enable transmitting data and control signals to/from each component independently.

In some embodiments, and as shown in FIGS. 1 and 2, the trailer 215 may include the CIU 225, the LIU 235-1 and the RIU 235-2. In an example, each of the integration units may include a dual-band transceiver that supports RF communications in a UHF band as well as in a Low Frequency (LF) band. The RF-433M transceiver 221 may be used to communicate with the VCU 245 in the tractor (as indicated by the dashed lines 298), whereas the 125 kHz RFID (Radio Frequency IDentification) module 222 may be used to communicate between the integration units (as indicated by the dashed lines 299).

In some embodiments, different frequency bands and alternate wireless protocols and devices may be employed in the operation of the rear-facing perception system. For example, the VCU and integration units may use Bluetooth, Zigbee, direct short-range communications (DSRC) based on the 802.11p wireless standard, and so on.

Figure 3:
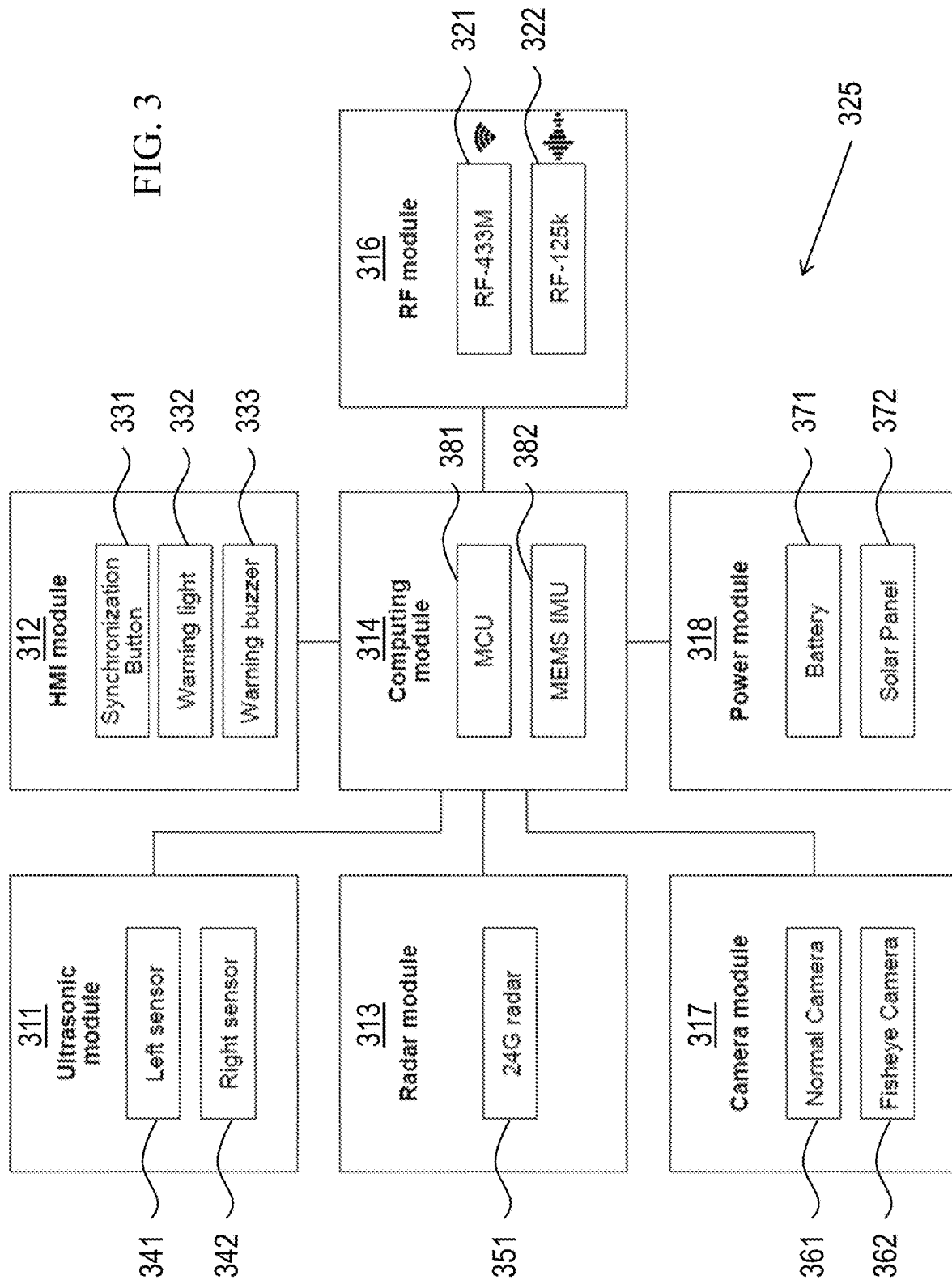
FIG. 3 shows a block diagram of an example center integration unit (CIU) of a rear-facing perception system.

FIG. 3 shows a block diagram of an example center integration unit (CIU) of a rear-facing perception system. In some embodiments, and as shown in FIG. 3, the CIU may include seven modules: an ultrasonic module 311, a human-machine interaction (HMI) module 312, a radar module 313, a computing module 314, an RF module 316, a camera module 317, and a power module 318.

In some embodiments, the ultrasonic module 311 may include a left sensor 341 and a right sensor 342, which are installed on the left and right corners of the trailer, respectively. In an example, the ultrasonic module 311 may be used not only to detect the presence of objects, but to ascertain their distance from the vehicle. In some embodiments, the camera module 317 may include a normal camera 361 and/or a fisheye camera 362 (e.g., to provide extremely wide angles of view ranging from 100°-180°) to provide a view of the area around the rear of the vehicle. For example, the inputs of the ultrasonic module 311 and/or the camera module 317 may be used independently to provide precise perception of any obstacles behind the vehicle.

In some embodiments, the inputs from the camera module 317 and the ultrasonic module 311 may be combined, or fused, prior to being used for detection of obstacles and people behind the vehicle. For example, augmenting the camera module 317 with the ultrasonic module 311 enables the rear-facing perception system to accurately determine the distances of objects from the vehicle, as well as to operate in low light conditions or even in full darkness.

In some embodiments, the radar module 313 may include a 24 GHz radar module 351, which is configured to augment the camera module 317. For example, the radar module 313 is able to detect obstacles in any weather conditions. Combining the camera and radar modules enables the rear-facing perception system to accurately operate in the presence of fog or mist, thereby ensuring the safety of the autonomous vehicles even in adverse situations.

In some embodiments, the HMI module 312 may include a synchronization button 331, a warning light 332 and a warning buzzer 333. For example, and as will be discussed later in this document, the synchronization button 331 may be configured to activate the corner integration units as part of the manual synchronization process between the VCU and the CIU, LIU and RIU. In an example, the warning light 332 and warning buzzer 333 may be configured to provide a visual and aural stimulus when the rear-facing perception system is operational.

In some embodiments, the computing module 314 includes a microcontroller unit (MCU, 381) and a Micro-Electro-Mechanical System (MEMS) based Inertial Measurement Unit (IMU). For example, an IMU is an electronic device that measures and reports a body's specific force, angular rate, and sometimes the magnetic field surrounding the body, using a combination of accelerometers and gyroscopes, sometimes also magnetometers. In an example, the MCU may control the MEMS IMU and/or other components to ensure that the rear-facing perception system is operating in an energy-efficiency manner to ensure vehicular and personnel safety.

In some embodiments, the RF module 316 includes a dual-band transceiver that supports RF communications in UHF and LF bands. The RF-433M transceiver 321 may be used to communicate with the VCU, whereas the 125 kHz RFID module 322 may be used to communicate with the LIU and RIU. In this example, the UHF and LF frequency bands are non-overlapping in frequency. In other embodiments, the dual-band communications may be orthogonal in time (e.g., using TDMA (time division multiple access)) or in structure (e.g., using CDMA (code division multiple access)).

In some embodiments, the power module 318 includes a battery 371 and/or a solar panel 372. More generally, the power module 318 is a self-powered source for the various components of the rear-facing perception system that does not require a constant connection to the power grid. In some embodiments, the power module 318 may be periodically re-charged to ensure that the various components function as intended during operation of the vehicle.

Figure 4:
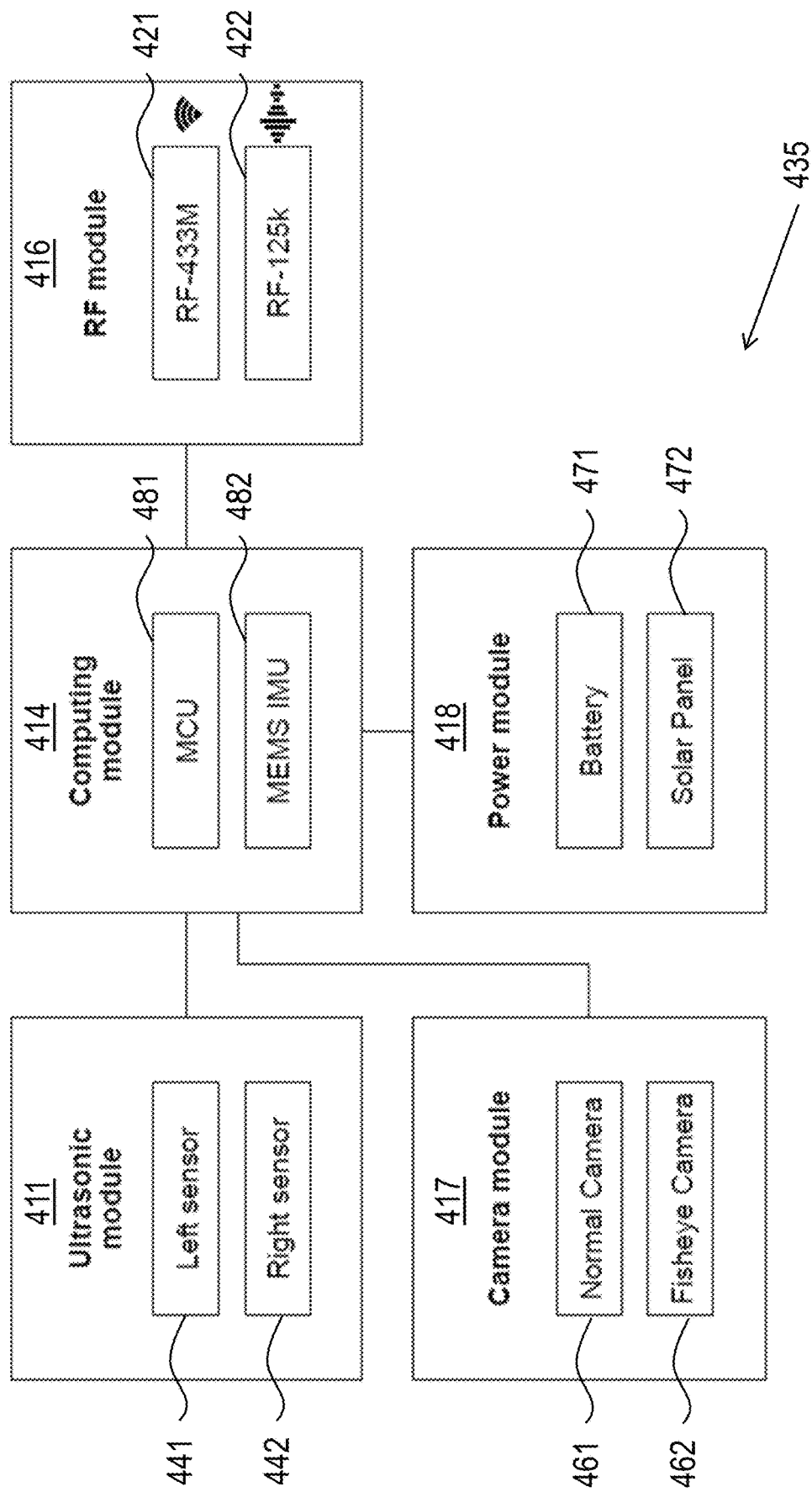
FIG. 4 shows a block diagram of an example corner integration unit of a rear-facing perception system.

FIG. 4 shows a block diagram of an example corner unit of a rear-facing perception system. This example includes some features and/or components that are similar to those shown in FIG. 3, and described above. At least some of these features and/or components may not be separately described in this section. In some embodiments, and as shown in FIG. 4, the LIU and/or RIU may include five modules: an ultrasonic module 411, a computing module 414, an RF module 416, a camera module 417, and a power module 418.

In some embodiments, the camera module 417 includes mechanisms to keep the respective normal and fisheye cameras of the CIU, LIU and RIU clean. For example, a camera cleaning system may be configured to spray a cleaning solvent (or water) onto the camera lens, followed by a puff of air to dry the camera lens. In another example, the VCU may provide the driver of the vehicle with an indication or reminder to ensure that the cameras are clean prior to operating the vehicle.

Figure 5:
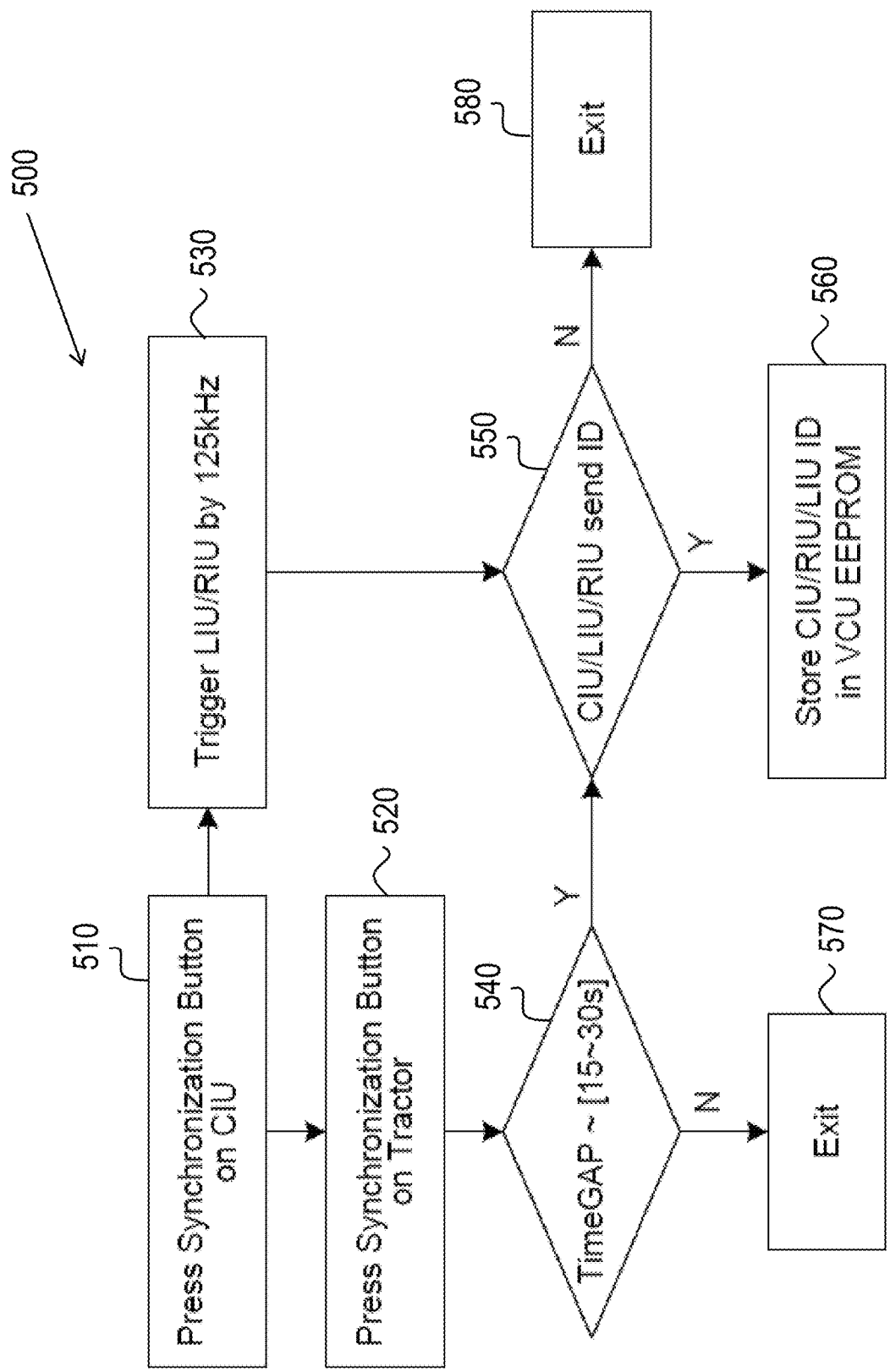
FIG. 5 shows a flowchart of an example method for manually synchronizing a rear-facing perception system.

FIG. 5 shows a flowchart of an example method for manually synchronizing a rear-facing perception system. A shown in FIG. 5, the manual synchronization process 500 begins at step 510, when the synchronization button on the CIU (e.g. synchronization button 331 as shown in FIG. 3) is pressed. Pressing the CIU synchronization button transmits a trigger signal using, for example, the 125 kHz RFID module in the dual-band transceiver (step 530). This trigger signal may be a synchronization signal for the LIU and RIU.

In some embodiments, step 510 may be followed by pressing the synchronization button on the tractor (e.g., the synchronization button 231 in FIG. 2, which may be located near the on-board diagnostics (OBD) port). The activation of the two synchronization buttons on the CIU and VCU, as well as the triggering of the RIU and LIU, needs to be followed by a time gap (or waiting period) of 15-30 seconds (step 540). If this waiting period is not available (e.g., due to turning off the vehicle for emergency reasons) during this manual synchronization process, the process is aborted and exits (step 570).

Typically, the manual synchronization process continues with step 550, wherein the CIU, LIU and RIU send their identification information to the VCU using, for example, the RF-433M module in the dual-band transceiver. If this process is successful (step 560), the VCU stores the IDs in the EEPROM (e.g., EEPROM 224 in FIG. 2). If the IDs are not successfully saved in the VCU, the manual synchronization process aborts (and exits, step 580).

Figure 6:
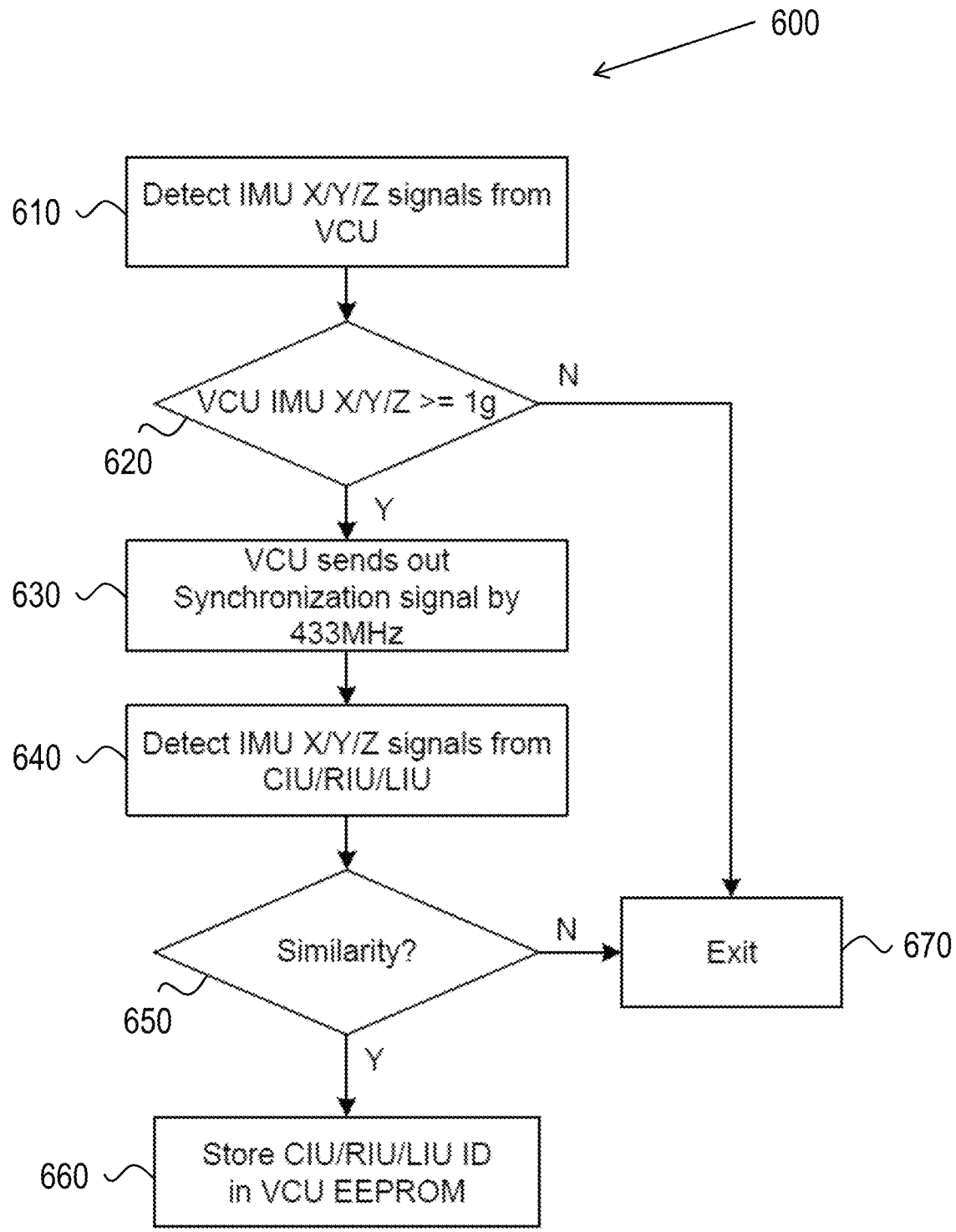
FIG. 6 shows a flowchart of another example method for automatically synchronizing a rear-facing perception system.

FIG. 6 shows a flowchart of another example method for automatically synchronizing a rear-facing perception system. In contrast to the manual synchronization process described in the context of FIG. 5, the automatic synchronization process shown in FIG. 6 does not require any manual intervention, and relies on the movement of components of the rear-facing perception system. For example, if a tractor-trailer with a newly installed rear-facing perception system does not need to initially move backwards (and therefore does not need the use of the rear-facing perception system), the forward movement of the tractor-trailer can trigger the automatic synchronization process as described in the context of FIG. 6.

The automatic synchronization process 600 beings at step 610, wherein movement of the VCU is detected in the form of signals from one or more axes of the IMU of the VCU. In an example, if the detected signals correspond to an acceleration of less than 1 g (step 620), then the automatic synchronization process terminates (step 670). However, if the detected signals correspond to an acceleration of greater than or equal to 1 g (e.g., an acceleration of 1 g equates to a rate of change in velocity of approximately 35 kilometers per hour (or 22 miles per hour) for each second that elapses), then the VCU transmits a synchronization signal using, for example, the RF-433M module in the dual-band transceiver (step 630).

This synchronization signal is received by the integration units (CIU, LIU, RIU), which then transmit signals corresponding to the axes of their corresponding IMUs (e.g., IMUs 382 and 482 in FIGS. 3 and 4, for the CIU and LIU/RIU, respectively). The IMU signals from the CIU/LIU/RIU are detected (step 640), and if they are similar to the IMU signals from the VCU (step 650), then the IDs from the integration units are stored in the VCU EEPROM (step 660, and similar to step 560 in FIG. 5). If, however, there is a mismatch in the IMU signals from the VCU and the integration units (step 650), the automatic synchronization process terminates (step 670). For example, the tractor may have just delivered the trailer at a loading dock, and after unhooking the trailer, is leaving from that location. In this case, the IMU signals from the tractor will register an acceleration of greater than 1 g, but the trailer IMU signals will be close to 0 g, and no synchronization will occur (as expected since the tractor is not attached to the trailer).

The manual and automatic synchronization processes described in the context of FIGS. 5 and 6, respectively, may typically be performed when a tractor and a trailer are initially paired. As long as the same tractor-trailer combination is in operation, the synchronization process need not be repeated. On the other hand, if the trailer is replaced, then the rear-facing perception system can be detached from the original trailer, affixed to the new trailer, and either the manual or automatic synchronization process can be performed.

Figure 7:
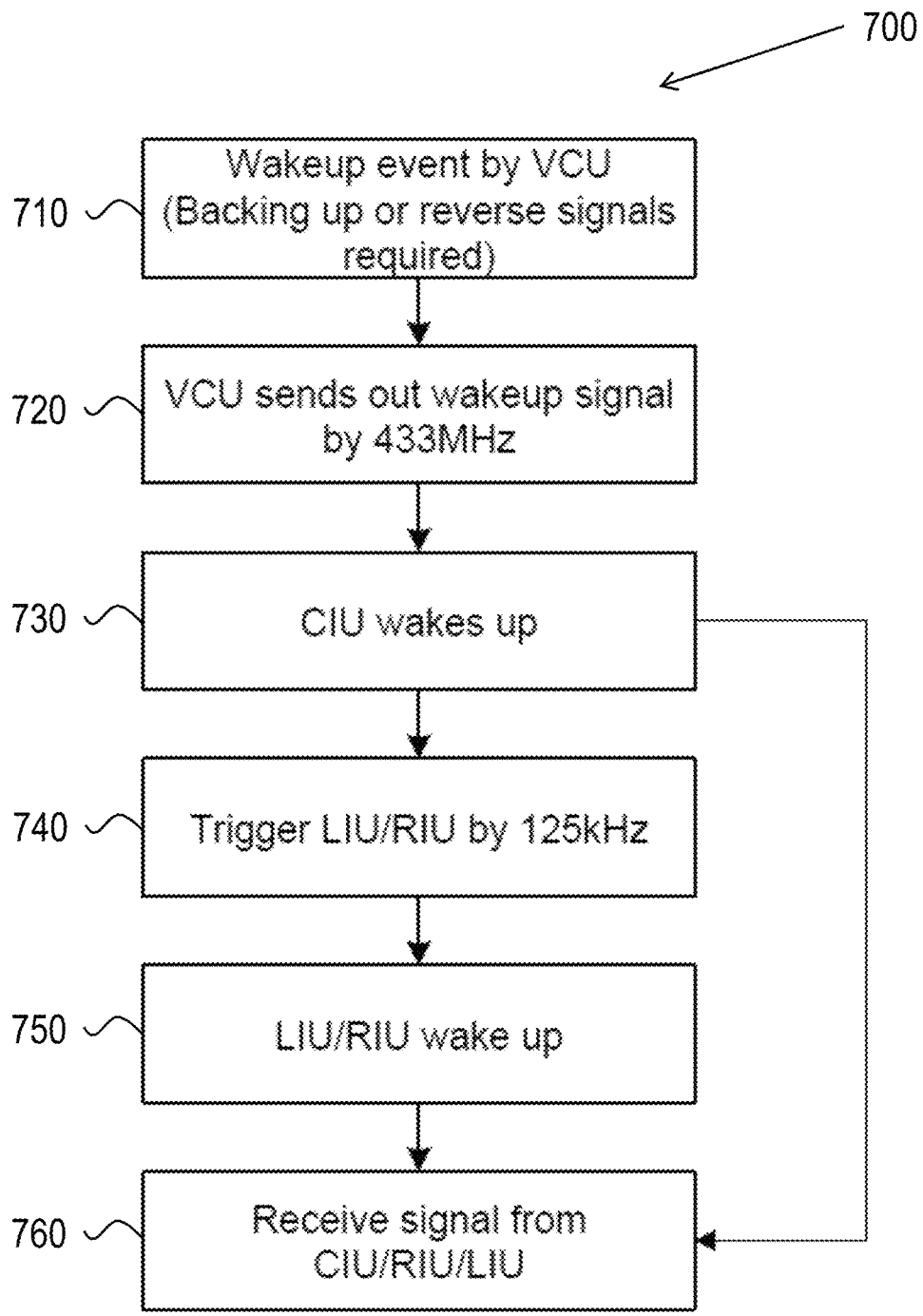
FIG. 7 shows a flowchart for an example method for a wakeup process of a rear-facing perception system.
Figure 8:
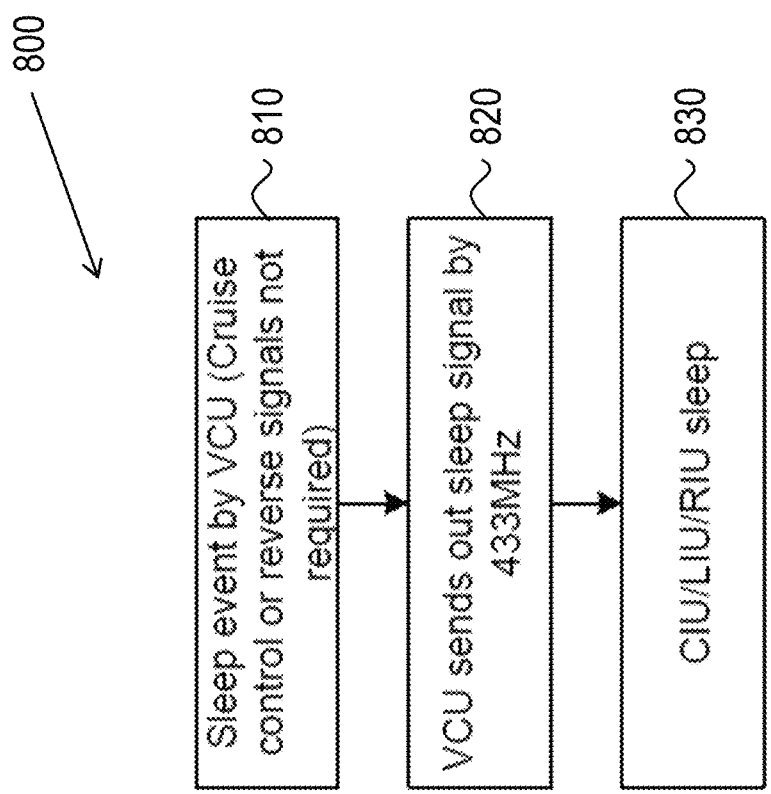
FIG. 8 shows a flowchart for an example method for a sleep process of a rear-facing perception system.

In some embodiments, embodiments of the disclosed technology implement wakeup and sleep processes to operate in a power-efficient manner, so as to enables the self-powered CIU, LIU and RIU to operate with frequent recharging. FIGS. 7 and 8 provide examples of the wakeup and sleep processes for the rear-facing perception system, respectively.

FIG. 7 shows a flowchart for an example method 700 for a wakeup process of a rear-facing perception system. The method 700 includes, at step 710, the VCU waking up based on an event that may be manually triggered or inferred from the operation of the vehicle. For example, if the vehicle is put in the reverse gear, the VCU automatically wakes up.

The method 700 includes, at step 720, the VCU transmitting a wakeup signal using, for example, the RF-433M module in the dual-band transceiver. In some embodiments, the wakeup signal is directed toward the CIU, which then wakes up (step 730) upon receiving the wakeup signal from the VCU.

In some embodiments, the CIU transmits a signal to the VCU in response to the wakeup signal. Additionally, the CIU sends a trigger signal (e.g., a wakeup signal that may be identical to or different from the wakeup signal received from the VCU) to the LIU and RIU using, for example, the 125 kHz RFID module in the dual-band transceiver (step 740). Upon receiving this trigger signal, the LIU and RIU wake up (step 750).

The wakeup process concludes with the VCU receiving a signal from the CIU, LIU and RIU (step 760), acknowledging their active mode of operation. Embodiments of the disclosed technology may use the wakeup process to ensure that the rear-facing perception system operates in a power-efficient manner.

FIG. 8 shows a flowchart for an example method 800 for a sleep process of a rear-facing perception system. The sleep process begins with a "sleep event" that includes the VCU detecting that the rear-facing perception system is not required (step 810). For example, if the vehicle is put into cruise control (which typically results in a prolonged period of forward motion), the VCU automatically detects this as a sleep event. In another example, the driver of the vehicle may explicitly trigger a sleep event if, for example, the tractor-trailer is in a queue at a weight station, and is not required to reverse through the entire process.

When the sleep event is detected or activated, the VCU transmits a sleep signal using, for example, the RF-433M module in the dual-band transceiver (step 820) to the integration units at the rear of the trailer. Upon receiving the sleep signal, the CIU, LIU and RIU switch to sleep mode (step 830). In some embodiments, switching to sleep mode includes the power module (e.g., 318 and 418 in FIGS. 3 and 4 for the CIU and LIU/RIU, respectively) switching off one or more modules (e.g., the ultrasonic module, the camera module, the radar module, and so on). In other embodiments, the power module may switch one or more modules into a power-saving operational mode wherein only some of the functionality of the respective models are active.

Figure 9:
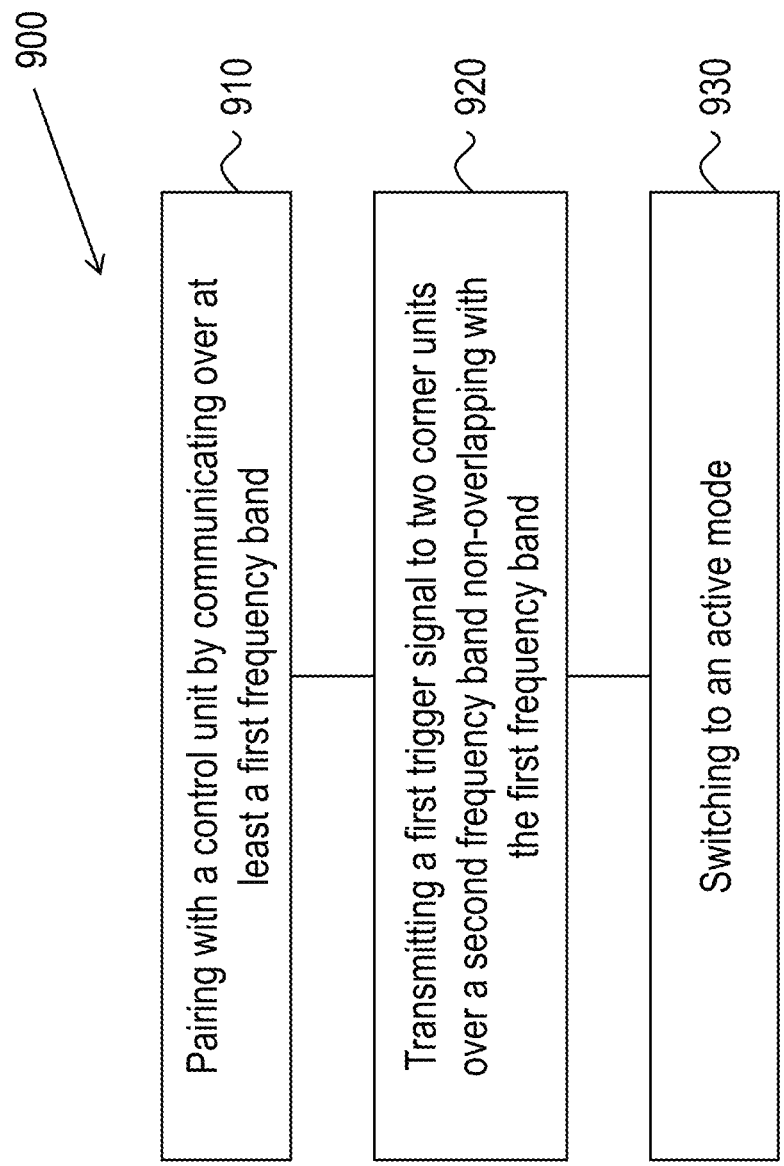
FIG. 9 shows a flowchart for an example method for operating a rear-facing perception system.

FIG. 9 shows a flowchart for an example method 900 for operating a rear-facing perception system. In some embodiments, the rear-facing perception system includes two corner units and a center unit, with each of the two corner units (LIE, RIU) and the center unit (CIU) including at least a camera module, a power module and a dual-band transceiver. The method 900, which may be implemented in a CIU, includes, at step 910, pairing with a control unit. In some embodiments, the pairing includes communicating, using the dual-band transceiver, over a first frequency band. In some embodiments, the power module comprises a battery.

The method 900 includes, at step 920, transmitting, upon successfully pairing, a first trigger signal to the two corner units. In some embodiments, the first trigger signal is transmitted over a second frequency band that is non-overlapping with the first frequency band.

The method 900 includes, at step 930, switching to an active mode after having transmitted the first trigger signal. In some embodiments, the first trigger signal causes the two corner units to switch to the active mode. In some embodiments, the active mode includes orienting the camera modules on the center unit and the two corner units to provide an unobstructed view of an area around a rear of the vehicle.

In some embodiments, and as described in the context of at least FIGS. 2-4, the first frequency band may include a Ultra High Frequency (UHF) band (e.g., the 433 MHz frequency band) and the second frequency band, which is non-overlapping with the first frequency band, may include a Low Frequency (LF) band (e.g., the 125 kHz frequency band).

In some embodiments, and as described in the context of FIG. 5, the pairing operation further includes transmitting a synchronization signal to the LIU and RIU over the second frequency band in response to a first manual trigger (e.g., pressing the synchronization button on the CIU), and transmitting an identification signal to the VCU over the first frequency band in response to a second manual trigger (e.g., pressing the synchronization button on the tractor).

In some embodiments, and as described in the context of FIG. 6, the pairing operation further includes receiving a synchronization signal from the VCU over the first frequency band, and transmitting a signal corresponding to the movement of the CIU (e.g., the signal from the MEMS IMU indicating an acceleration of greater than 1 g in order to continue with the automatic synchronization process).

In some embodiments, and as described in the context of FIG. 7, the method 900 further includes receiving, upon successfully pairing, a first wakeup signal from the VCU over the first frequency band. The CIU awakes on the reception of the first wakeup signal, and subsequently triggers the LIU and RIU over the second frequency band. Once all the integration units are awake, the VCU receives signals from the CIU, LIU and RIU, acknowledging their switching over to active mode. In an example, switching over to active mode includes orienting the camera modules of the CIU, LIU and RIU to provide an unobstructed view of the area around the rear of the vehicle.

In some embodiments, and as described in the context of FIG. 8, the method 900 further includes transmitting a second trigger signal to the LIU and RIU over the second frequency band. In an example, the second trigger signal may be a sleep signal, and the CIU may switch over to a power-saving mode after transmitting the second trigger signal. Additionally, the second trigger signal may cause the LIU and RIU to switch to the power-saving mode.

More generally, and in some embodiments, the VCU may communicate directly with the CIU over the first frequency band. Subsequently, the CIU may communicate with the LIU and RIU (e.g., relay the information received from the VCU) over the second frequency band. In other embodiments, the VCU may communicate directly with each of the CIU, LIU and RIU.

Figure 10:
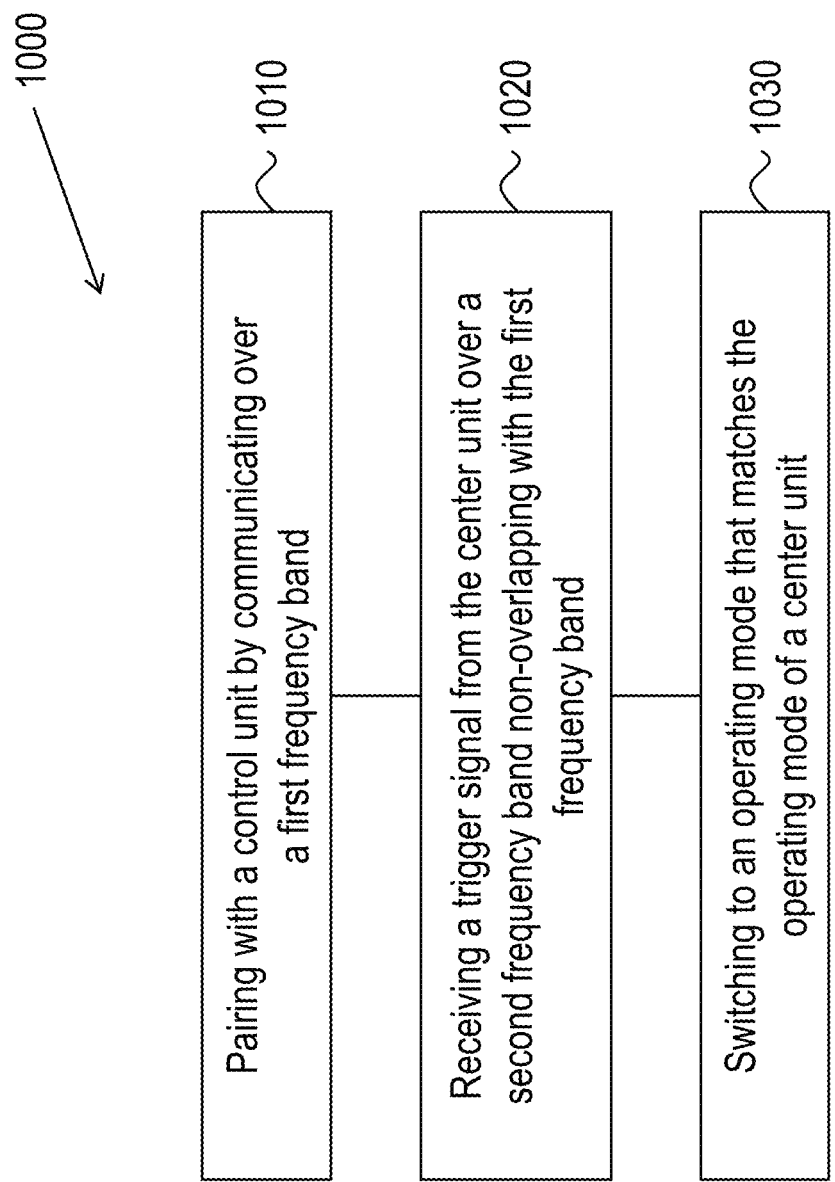
FIG. 10 shows a flowchart for another example method for operating a rear-facing perception system.

FIG. 10 shows a flowchart for another example method 1000 for operating a rear-facing perception system. This example includes some features and/or steps that are similar to those shown in FIG. 9, and described above. At least some of these features and/or components may not be separately described in this section. The method 1000, which may be implemented in a LIU and/or RIU, includes, at step 1010, pairing with the control unit by communicating, using the dual-band transceiver, over a first frequency band.

The method 1000 includes, at step 1020, receiving, upon successfully pairing, a trigger signal from the center unit over a second frequency band non-overlapping with the first frequency band.

The method 1000 includes, at step 1030, switching, subsequent to receiving the trigger signal, to an operating mode that matches the operating mode of the center unit. In some embodiments, the operating mode may be an active mode or a power-saving mode. For example, the power-saving mode may include turning off the camera module, and the active mode may include orienting the camera modules on the center unit and the two corner units to provide an unobstructed view of an area around a rear of the vehicle.

Figure 11:
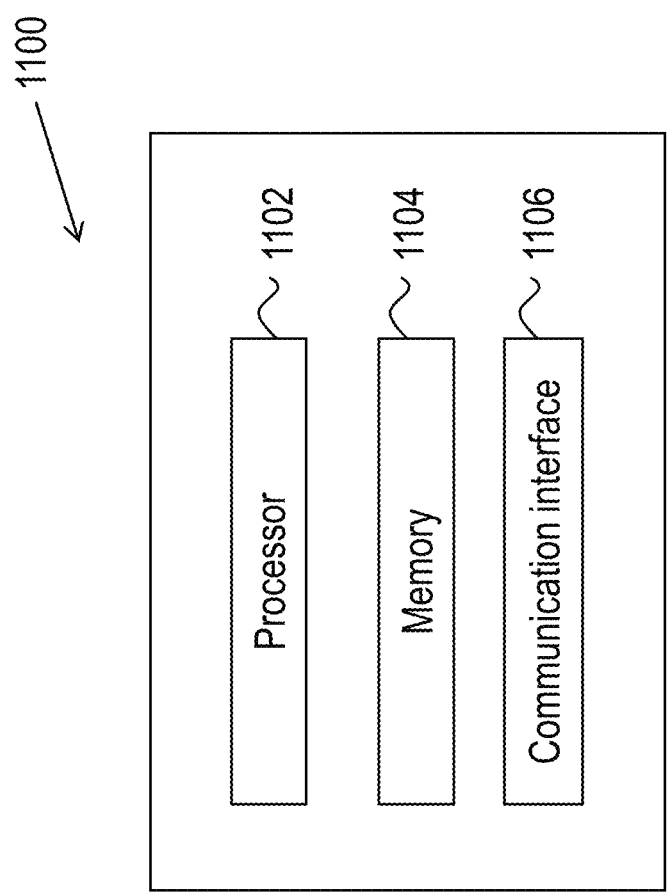
FIG. 11 shows an example of a hardware platform that can implement some techniques described in the present document.

FIG. 11 shows an example of a hardware platform 1100 that can be used to implement some of the techniques described in the present document. For example, the hardware platform 1100 may implement the methods 900 and/or 1000, or may implement the various modules described herein. The hardware platform 1100 may include a processor 1102 that can execute code to implement a method. The hardware platform 1100 may include a memory 1104 that may be used to store processor-executable code and/or store data. The hardware platform 1100 may further include a communication interface 1106. For example, the communication interface 1106 may implement one or more of the communication protocols (LTE, Wi-Fi, and so on) described herein.

Implementations of the subject matter and the functional operations and modules described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGAs (field programmable gate arrays) or ASICs (application specific integrated circuits).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., (E)EPROM and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operating a rear-facing perception unit in a vehicle, the rear-facing perception unit comprising a control unit, two corner units, and a center unit, each of the two corner units and the center unit comprising a camera module, a dual-band transceiver, and a power module, the method comprising:
    pairing with the control unit in response to detecting, by an inertial measurement unit (IMU) at the control unit, an acceleration greater than or equal to a threshold acceleration, wherein the pairing comprises:
    transmitting, in response to the detecting the acceleration greater than or equal to the threshold acceleration, a synchronization signal to the center unit and the two corner units that are positioned to provide an unobstructed view of an area around a rear of the vehicle,
    wherein the synchronization signal is transmitted over a first frequency band that is non-overlapping with a second frequency band used for communications between the corner units and the center unit;
    transmitting, upon successfully pairing, a first trigger signal to the two corner units, wherein the first trigger signal is transmitted over the second frequency band; and
    switching, subsequent to transmitting the first trigger signal, to an active mode,
    wherein the first trigger signal causes the two corner units to switch to the active mode,
    wherein the power module comprises a battery,
    wherein the camera module of the center unit comprises a fisheye camera, and
    wherein the active mode comprises orienting the camera modules on the center unit and the two corner units to provide an unobstructed view of an area around a rear of the vehicle.

2. The method of claim 1, wherein the first frequency band comprises an Ultra High Frequency (UHF) band, wherein the center unit comprises a low power 433 MHz (LPD433) device to perform the pairing, wherein the second frequency band comprises a Low Frequency (LF) band, and wherein one or more 125 kHz RFID (Radio Frequency IDentification) modules transmit the first trigger signal.

3. The method of claim 1, wherein the pairing further comprises:
    transmitting, in response to receiving the synchronization signal, a signal corresponding to a movement of the center unit.

4. The method of claim 1, wherein switching to the active mode comprises:
    receiving, upon successfully pairing, a first wakeup signal over the first frequency band.

5. The method of claim 1, further comprising:
    transmitting a second trigger signal to the two corner units, wherein the second trigger signal is transmitted over the second frequency band; and
    switching, subsequent to transmitting the second trigger signal, to a power-saving mode,
    wherein the power-saving mode comprises turning off the camera module, and
    wherein the second trigger signal causes the two corner units to switch to the power-saving mode.

6. A system for rear-facing perception for a truck with a trailer, comprising:
    a control unit affixable to the truck;
    two corner units affixable to rear corners of the trailer using an attachment mechanism; and
    a center unit affixable to a rear surface of the trailer using the attachment mechanism,
    wherein each of the two corner units and the center unit comprises a camera module, a dual-band transceiver, a power module, and an inertial measurement unit (IMU),
    wherein the camera modules of the two corner units and the center unit are oriented to provide an unobstructed view of an area around a rear of the trailer,
    wherein the camera module of the center unit comprises a fisheye camera,
    wherein the dual-band transceivers of the two corner units and the center unit are configured to:
    perform a first set of wireless communications between the control unit and the center unit and two corner units over a first frequency band comprising:
        pairing with the control unit in response to detecting, by an inertial measurement unit (IMU) at the control unit, an acceleration greater than or equal to a threshold acceleration,
            wherein the pairing comprises transmitting, in response to detecting by an inertial measurement unit (IMU) an acceleration greater than or equal to a threshold acceleration, a synchronization signal to the center unit and the two corner units,
            wherein the synchronization signal is transmitted over a first frequency band that is non-overlapping with a second frequency band used for communications between the corner units and the center unit;
        transmitting, upon successfully pairing, a first trigger signal to the two corner units,
            wherein the first trigger signal is transmitted over the second frequency band; and
        switching, subsequent to transmitting the first trigger signal, to an active mode,
            wherein the first trigger signal causes the two corner units to switch to the active mode,
            wherein the active mode comprises orienting the camera modules on the center unit and the two corner units to provide an unobstructed view of an area around a rear of the vehicle.

7. The system of claim 6, wherein the first frequency band comprises an Ultra High Frequency (UHF) band, wherein the control unit comprises a low power 433 MHz (LPD433) device to perform the first set of wireless communications, wherein the second frequency band comprises a Low Frequency (LF) band, and wherein one or more 125 kHz RFID (Radio Frequency IDentification) modules perform a second set of wireless communications.

8. The system of claim 6, wherein the attachment mechanism is a magnetic panel, a suction panel, or a hook and fastener system.

9. The system of claim 6, wherein the first set of wireless communications comprises a synchronization process, a wakeup process or a sleep process.

10. The system of claim 9, wherein the synchronization process comprises:
   detecting a first set of signals corresponding to a movement of the control unit;
   detecting a second set of signals corresponding to movements of the center unit and the two corner units, wherein the second set of signals comprise the one or more measurements from the corresponding IMU;
   comparing the first set of signals and the second set of signals; and
   selectively communicating, based on the comparing, identification signals from the center unit and the two corner units to the control unit over the first frequency band.

11. The system of claim 9, wherein the sleep process comprises:
   determining a status of the vehicle;
   detecting, based on the status of the vehicle, that the vehicle will not require use of the rear-facing perception unit for a predetermined duration of time; and
   transmitting a sleep signal to the center unit and the two corner units over the first frequency band.

12. The method of claim 1, further comprising:
   receiving, at the control unit, IMU acceleration measurements from the center unit and the two corner units;
   comparing the received IMU acceleration measurements to the detected IMU measurement at the control unit; and
   storing, at the control unit in response to the received IMU acceleration measurements being equal to or nearly equal to the detected IMU measurement, identifiers for the center unit and the two corner units.

13. The system of claim 6, wherein the pairing further comprises:
   transmitting, in response to receiving the synchronization signal, a signal corresponding to a movement of the center unit.

14. The system of claim 6, wherein switching to the active mode comprises:
   receiving, upon successfully pairing, a first wakeup signal over the first frequency band.

15. The system of claim 6, wherein the transmitting further comprises:
   transmitting a second trigger signal to the two corner units, wherein the second trigger signal is transmitted over the second frequency band; and
   switching, subsequent to transmitting the second trigger signal, to a power-saving mode,
   wherein the power-saving mode comprises turning off the camera module, and
   wherein the second trigger signal causes the two corner units to switch to the power-saving mode.

16. The system of claim 6, wherein the control unit further performs:
   receiving, at the control unit, IMU acceleration measurements from the center unit and the two corner units;
   comparing the received IMU acceleration measurements to the detected IMU measurement at the control unit; and
   storing, at the control unit in response to the received IMU acceleration measurements being equal to or nearly equal to the detected IMU measurement, identifiers for the center unit and the two corner units.

* * * * *